J. W. Dixon.
Paper Making Process.
Nº 51,705. Patented Dec. 26, 1865.
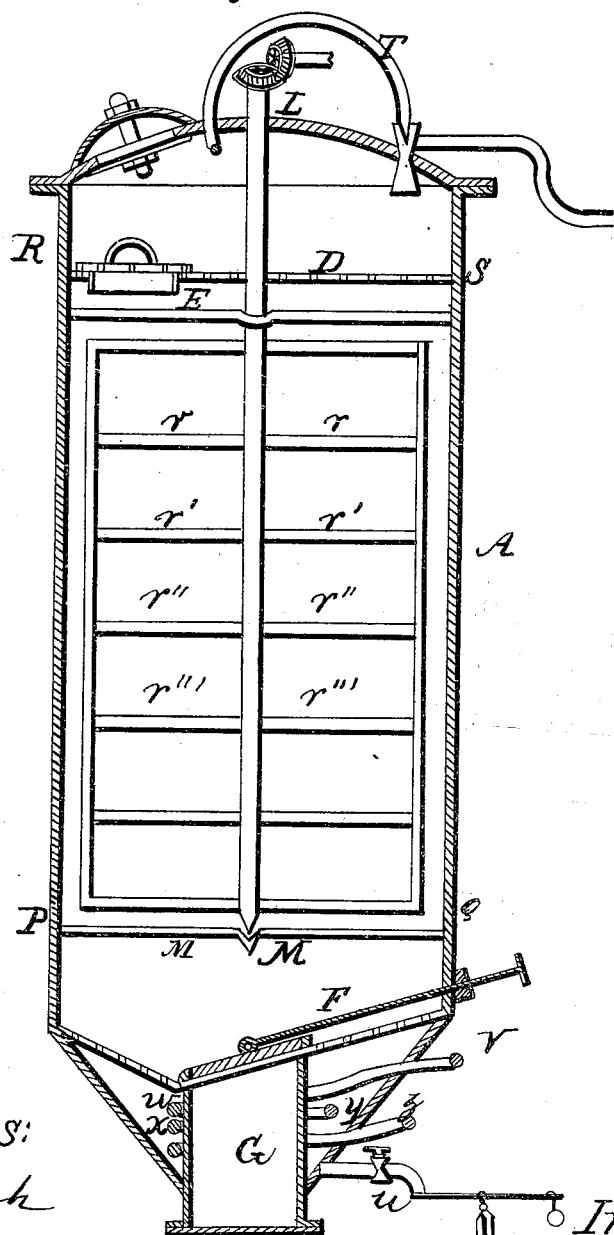
Fig: 1.
Witnesses:
John Welsh
James Duff
Inventor:
John W. Dixon

UNITED STATES PATENT OFFICE.

JOHN W. DIXON, OF PHILADELPHIA, PENNSYLVANIA.

IMPROVED PROCESS FOR TREATING WOOD, STRAW, AND OTHER VEGETABLE FIBERS.

Specification forming part of Letters Patent No. 51,705, dated December 26, 1865.

*To all whom it may concern:*

Be it known that I, JOHN W. DIXON, of the city of Philadelphia, have invented a new and useful Process of Pulping Wood, Straw, and other Analogous Vegetable Fibrous Materials; and I do hereby declare the following to be a full and exact description thereof, reference being had to the annexed drawings, making a part of this specification, which represent a convenient form of apparatus for applying my process.

My improved process consists in subjecting wood, woody matter, and other analogous vegetable fibrous material to the chemical dissolving power of highly-heated water under pressure in a liquid state within a close digester in which the woody matter is merely stirred up and agitated in the water by a series of revolving or vibrating arms, and in conjunction therewith fresh water is constantly forced in to supply an equal quantity of refuse water forced out or escaping therefrom.

Figure 1 represents a strong iron digester, A, capable of resisting a pressure of over two hundred and fifty pounds to the square inch. It is provided with a man-hole and cover and an upper perforated diaphragm, D, with an opening, E, for the admission of the wood and other vegetable matter to be pulped; also a lower perforated diaphragm, F, with an opening covered by a slide-valve. A vertical shaft, L M, is supported upon cross-arms at P Q and R S. To this vertical shaft a series of radial arms or vanes are attached, $r\ r'\ r''\ r'''$, so that when the digester is filled with woody matter and water the slowly-revolving arms will commingle them together. An injector or pump is placed at T to force fresh water into the apparatus, and an escape-cock with a loaded or balanced valve at U, so adjusted as to permit the escape of refuse water whenever fresh water is introduced at T.

The digester may be heated in any convenient manner; but I prefer a steam or hot-water coil, such as V W X Y Z.

The digester, having been filled with woody matter and water, should be securely closed. The digester should then be heated until the water contained therein attains a pressure of one hundred and fifty to two hundred and fifty pounds per square inch, although a slow action will take place with wood at even a lower temperature than one hundred and fifty pounds, and with straw, cornstalks, and similar material a slow action will take place at a pressure of one hundred and twenty-five pounds. The stirrer L M should be then made to revolve slowly. After the digester has been maintained at this temperature for some time—say one hour, more or less—fresh water should be forced in, either continuously or at intervals, by the pump or injector at T. The balance-valve at U should be so arranged that an equal amount of refuse water will escape therefrom. The arms, instead of revolving, may vibrate up and down or backward and forward. After the wood, &c., has been sufficiently pulped it is permitted to drain off by opening the valve at U, and then the pulp escapes through the slide-valve opening F, and thence through G into the engine or stuff-chest.

Having thus described my process, what I claim as new therein, and desire to secure by Letters Patent, is—

1. Subjecting wood, woody matter, straw, and other analogous vegetable matter to the chemical action of highly-heated water, under pressure, in a liquid state within a digester wherein the mass is merely stirred together, substantially as above described.

2. In combination with subjecting wood, woody matter, and other fibrous material to the action of highly-heated water in a liquid state, under pressure, in a digester wherein the mass is merely stirred together, the injection of fresh water into the mass while the pressure is maintained, either continuously or at intervals, to supply the place of an equal quantity of water escaping or forced out.

JOHN W. DIXON.

Witnesses:
 JOHN WELSH,
 JAMES DUFF.